(12) United States Patent
Tsutsumi et al.

(10) Patent No.: US 8,418,800 B2
(45) Date of Patent: Apr. 16, 2013

(54) VEHICLE STEERING CONTROLLER AND METHOD

(75) Inventors: Junji Tsutsumi, Yokohama (JP);
Toshiaki Kasahara, Yokohama (JP);
Yuusuke Katou, Yokohama (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 1424 days.

(21) Appl. No.: 11/605,822

(22) Filed: Nov. 28, 2006

(65) Prior Publication Data
US 2007/0144815 A1    Jun. 28, 2007

(30) Foreign Application Priority Data
Nov. 29, 2005    (JP) .................................. 2005-343113

(51) Int. Cl.
*B62D 5/00*    (2006.01)
(52) U.S. Cl.
USPC ........................................................ 180/402
(58) Field of Classification Search .................... 180/402
See application file for complete search history.

(56) References Cited

U.S. PATENT DOCUMENTS

| | | | | |
|---|---|---|---|---|
| 6,220,385 B1 * | 4/2001 | Bohner et al. ................ | 180/403 |
| 6,580,989 B1 * | 6/2003 | Husain et al. ................. | 701/41 |
| 6,899,196 B2 * | 5/2005 | Husain et al. ................. | 180/402 |
| 6,938,721 B2 * | 9/2005 | Ono et al. .................... | 180/402 |
| 2002/0059021 A1 * | 5/2002 | Nishizaki et al. ............. | 701/41 |
| 2002/0162700 A1 * | 11/2002 | Moser et al. .................. | 180/443 |
| 2003/0127274 A1 * | 7/2003 | Dominke et al. ............. | 180/402 |
| 2005/0082108 A1 * | 4/2005 | Husain ......................... | 180/402 |
| 2005/0247508 A1 * | 11/2005 | Gilliland et al. ............. | 180/402 |
| 2007/0151795 A1 * | 7/2007 | Chino et al. .................. | 180/444 |

FOREIGN PATENT DOCUMENTS

| | | |
|---|---|---|
| DE | 103 52 495 A1 | 6/2005 |
| EP | 1 481 874 A2 | 12/2004 |
| JP | 04-055166 | 2/1992 |
| JP | 10-310067 | 11/1998 |
| JP | 2000-085595 | 3/2000 |
| JP | 2001-026277 | 1/2001 |
| JP | 2002-225733 | 8/2002 |
| JP | 2004-231116 | 8/2004 |
| JP | 2006-182302 | 7/2006 |
| JP | 2006-335209 | 12/2006 |
| JP | 2007-185985 | 7/2007 |
| JP | 2007-203885 | 8/2007 |
| JP | 2007-230360 | 9/2007 |

\* cited by examiner

*Primary Examiner* — Tashiana Adams
(74) *Attorney, Agent, or Firm* — Young Basile

(57) ABSTRACT

A vehicle steering device and method for controlling steering of a steer-by-wire vehicle. A steering instrument receives input from a driver and a turning device turns the wheel(s). A selectively engageable backup clutch is positioned between the steering instrument and the turning device. Whether or not the backup clutch is engaged is based a steering state signal from the steering instrument and a turning state signal from the turning device.

22 Claims, 18 Drawing Sheets

VEHICLE STEERING CONTROLLER AND METHOD

CROSS-REFERENCES TO RELATED APPLICATION

This application claims priority from Japanese Patent Application Serial No. 2005-343113, filed on Nov. 29, 2005, which is incorporated herein in its entirety by reference.

TECHNICAL FIELD

The present invention generally pertains to vehicle steering control by means of a so-called steer-by-wire system that enables mechanical separation/connection between a manipulable steering instrument, typically a steering wheel, which receives the input manipulations of the driver, and a turning device that turns the steered wheels through a backup clutch when the clutch is engaged.

BACKGROUND

In the known so-called steer-by-wire (SBW) systems that eliminate the mechanical linkage between the steering wheel and the steering mechanism of the front wheels such as that described in Japanese Kokai Patent Application No. 2002-225733, there is a backup clutch for mechanically connecting the steering wheel and the steering mechanism. In the event of a malfunction in some part of the SBW system, the clutch is quickly engaged to cancel SBW control, and the system is switched to an assistance control steering mode that can reduce the steering effort of the driver.

BRIEF SUMMARY OF THE INVENTION

The invention provides a vehicle steering device for steering at least one wheel of a vehicle. According to one example taught herein, the device comprises a steering instrument operable to receive input from a driver, a turning device operable to turn the at least one wheel, a selectively engageable backup clutch positioned between the steering instrument and the turning device and a controller. The controller is operable to judge whether the backup clutch is engaged based on a steering state signal from the steering instrument and a turning state signal of the turning device.

Another example of the vehicle steering device comprises steering means for receiving instructions for the at least one wheel from a driver, turning means for turning the at least one wheel responsive to the steering means, clutch means releasably engageable between the steering means and the turning means for steering the at least one wheel when the clutch means is engaged, steering detection means for detecting a steering state of the steering means, turning detection means for detecting a turning state of the turning means and judgment means for judging whether the clutch means is engaged based on the steering state and the turning state.

Vehicle steering control methods are also taught herein. At least one wheel is controlled using a steer-by-wire steering system including a steering instrument and a turning device responsive to signals from the steering instrument and a releasably engageable backup clutch between the steering instrument and the turning device. One example of a method comprises detecting a steering state signal from the steering instrument, detecting a turning state signal from the turning device and judging whether the backup clutch is engaged based on the steering state signal and the turning state signal.

BRIEF DESCRIPTION OF THE DRAWINGS

The description herein makes reference to the accompanying drawings wherein like reference numerals refer to like parts throughout the several views, and wherein.

DETAILED DESCRIPTION OF EMBODIMENTS OF THE INVENTION

Figure 1:
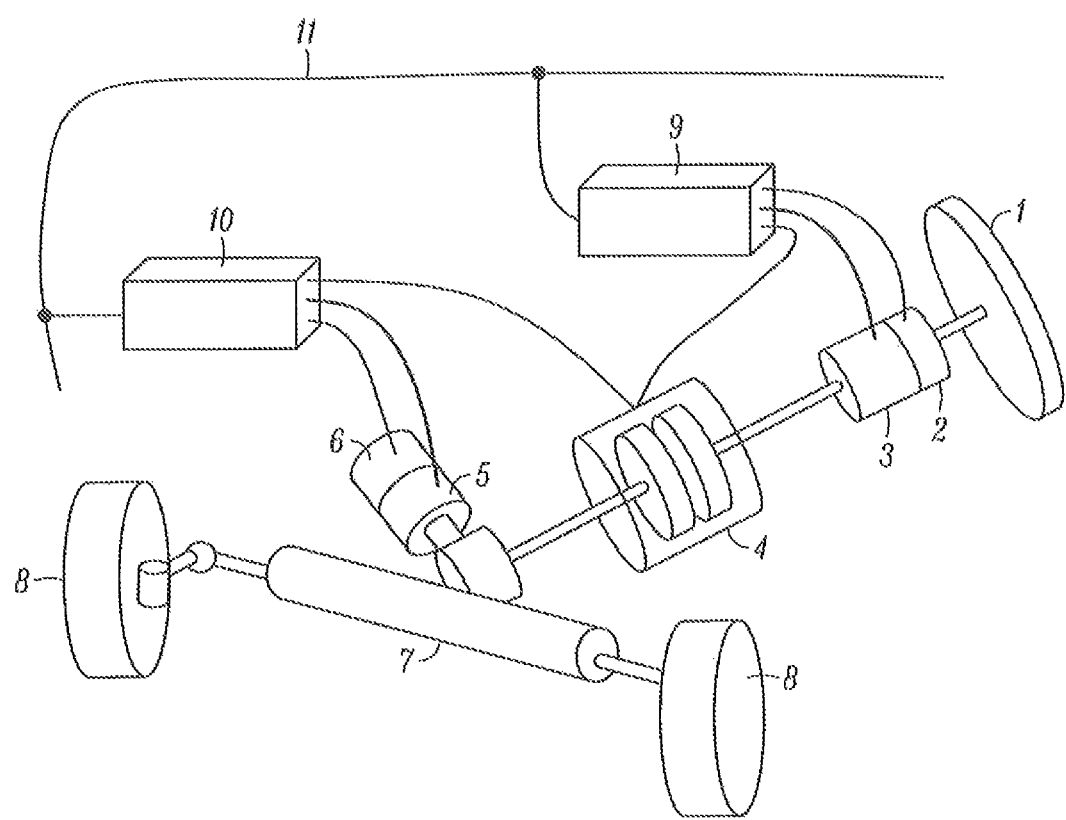
FIG. 1 is a diagram illustrating the steer-by-wire (SBW) system showing the vehicle steering controller of the first embodiment.

Known steer-by-wire (SBW) systems suffer from several problems. If a malfunction does not occur in the SBW system, and the backup clutch is erroneously connected, the structure may continue SBW control. As a result, a condition known as steering wheel sticking may take place. That is, in the case of erroneous connection of the backup clutch, the turning actuator is driven such that the actual turning angle is brought to follow the instruction turning angle under SBW control. In this case, because the steering wheel and the steered wheels are mechanically connected to each other, corresponding to steering of the steered wheels, the steering wheel is rotated correspondingly, and the instruction turning angle is changed. As a result, a state without a reduced deviation between the instruction turning angle and the actual turning angle results, so that the turning torque may increase and steering sticking may take place.

Embodiments of the invention explained with reference to the drawing figures improve known steer-by-wire (SBW) steering systems by providing a type of vehicle steering device that can detect the engagement state of a backup clutch without adding new sensors to the SBW system. For example, the teachings herein disclose that in the engaged state of the backup clutch, the steering instrument and the turning device match each other during operation. As a result, by determining the engagement state of the backup clutch based on the detected state of the steering instrument and the detected state of the turning device, without installing a new sensor or the like and using this information, the engagement state of the backup clutch can be determined. Other embodiments are described hereinafter.

FIG. 1 is a diagram illustrating the constitution of the steer-by-wire (SBW) system that uses a vehicle steering controller according to a first embodiment. The SBW system includes the following parts: steering instrument or wheel 1, steering angle sensor 2, reactive force motor 3, backup clutch 4, turning motor 5, turning angle sensor 6, steering mechanism 7, front wheels 8, reactive force controller 9, turning controller 10 and communication line 11. By example, reactive force motor 3 and turning motor 5 can be brushless motors, etc.

For this SBW system, steering wheel 1 and steering mechanism 7 for front wheels 8 are mechanically cut off from each other. The function of backup is performed by backup clutch 4. In the event that some malfunction in the SBW system occurs, backup clutch 4 is engaged so that steering wheel 1 and steering mechanism 7 are mechanically connected to each other, and the vehicle can operate without using the SBW system.

In this first embodiment, when backup clutch 4 is in the released state, turning motor 5 is driven to match the instructed turning angle corresponding to the manipulation or angular or rotational position of steering wheel 1. SBW control is performed to drive reactive force motor 3 such that a steering reactive force torque is imparted to the steering wheels 1 corresponding to the turning state of front wheels 8.

Turning controller 10 computes the instructed current value of turning motor 5 and drives turning motor 5 so that the actual turning angle of front wheels 8 comes into agreement with the instructed turning angle.

Reactive force controller 9 computes the instructed current value of reactive force motor 3 based on the turning angle of front wheels 8 detected with turning angle sensor 6 and drives reactive force motor 3. Based on the rotation manipulation amount of steering wheel 1 detected with steering angle sensor 2, reactive force controller 9 computes the instructed turning angle.

When backup clutch 4 is in the released state, variable gear control (or variable turning control) is performed to adjust the ratio of the turning angle of front wheels 8 to steering wheel 1 corresponding to the vehicle speed or the like. With this variable gear control, for example, two control modes can be realized. When the vehicle operates at a very low speed the ratio of the actual turning angle to the steering wheel angle is increased so as to reduce the steering effort when turning corners, etc. On the other hand, when the vehicle operates at a high speed the ratio of the actual turning angle to the steering wheel angle is reduced to increase the stability in the straight running state of the vehicle.

In this embodiment, when backup clutch 4 is in the engaged state while SBW control is canceled, assisting steering control is performed based on the steering torque of the driver estimated from the current value in reactive force motor 3 or turning motor 5 by driving reactive force motor 3 and/or turning motor 5 so that a torque is added to assist the manipulation of steering wheels 1 by the driver.

The steering control device is constructed to function by means of reactive force controller 9 and turning controller 10. SBW control is performed by driving turning motor 5 based on the instructed turning angle corresponding to the manipulation state or angular or rotational position of steering wheel 1 when it is determined that backup clutch 4 is in the released state. SBW control is canceled or stopped when it is determined that backup clutch 4 is in the engaged state.

Figure 2:
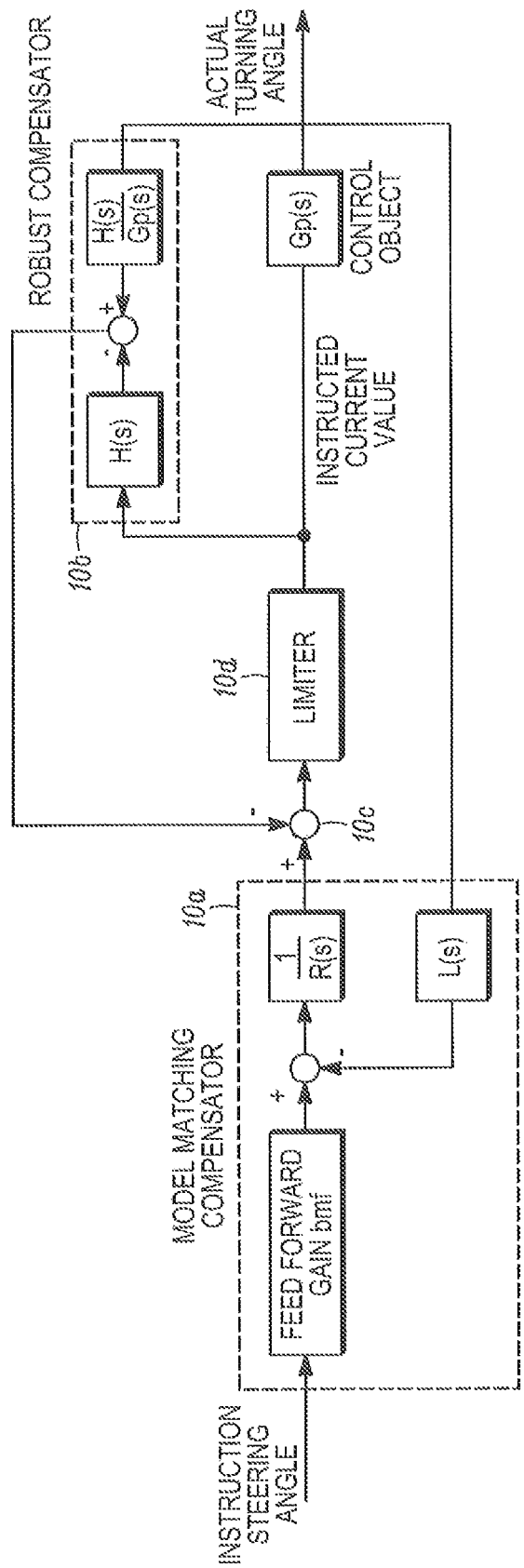
FIG. 2 is a block diagram illustrating the turning angle control system adopting the robust model matching scheme in turning controller 10 of the first embodiment.

FIG. 2 is a block diagram illustrating the turning angle control system adopting the robust model matching scheme for turning controller 10 in the first embodiment. Here, the term "robust model matching scheme" refers to a scheme whereby the dynamic characteristics of the vehicle as the control object are preset by means of a nominal model. Then, while the influences of error in forming the model and external disturbances are reduced to a minimum level, control is performed to be in agreement with the preset nominal model.

Model matching compensator 10a is a feed-forward compensator into which instruction turning angle θtc and actual turning angle θt are input. The output of the model matching compensator 10a is an instructed motor current corresponding to the desired response characteristics provided to it beforehand. Robust compensator 10b is an external disturbance compensator that receives the instructed current as input to the control object. Actual turning angle θt is output from the control object, as is estimated external disturbance value Irbst with the control hampering factors including the modeling error taken as the external disturbance.

Difference unit 10c subtracts the estimated external disturbance value Irbst of robust compensator 10b from the instructed motor current of model matching compensator 10a and generates an instructed current that nullifies the external disturbance.

Current limiter 10d outputs the instructed current as is to turning motor 5 as the control object when the instructed current from difference unit 10c is lower than the rated limit current of turning motor 5. In contrast, current limiter 10d outputs a limit current to turning motor 5 as the control object when the instructed current exceeds the limit current. The robust model matching scheme makes it possible to realize a control system with a high resistance to external disturbances that allows tracking of the actual turning angle with the nominal response characteristics even when external disturbances occur.

Reactive force controller 9 and turning controller 10 are used to execute engagement/release of backup clutch 4, and at the same time, they determine the engagement state and released state of backup clutch 4. According to the example shown, the controllers are each standard microcontrollers that include a central processing unit (CPU), random access memory, read only memory and input/output ports receiving input signals and sending output signals as discussed in more detail below. The functions described herein are generally programming instructions stored in memory and are performed by the logic of the CPU. Of course, the controller that performs the functions described herein could also be part of a dedicated microcontroller or could be a microprocessor using external memory. In addition, the controllers 9, 10 could be controlled by a single dedicated microcontroller located in one of the controllers 9, 10, or a standard engine controller remote from both the controllers 9, 10.

Figure 3:
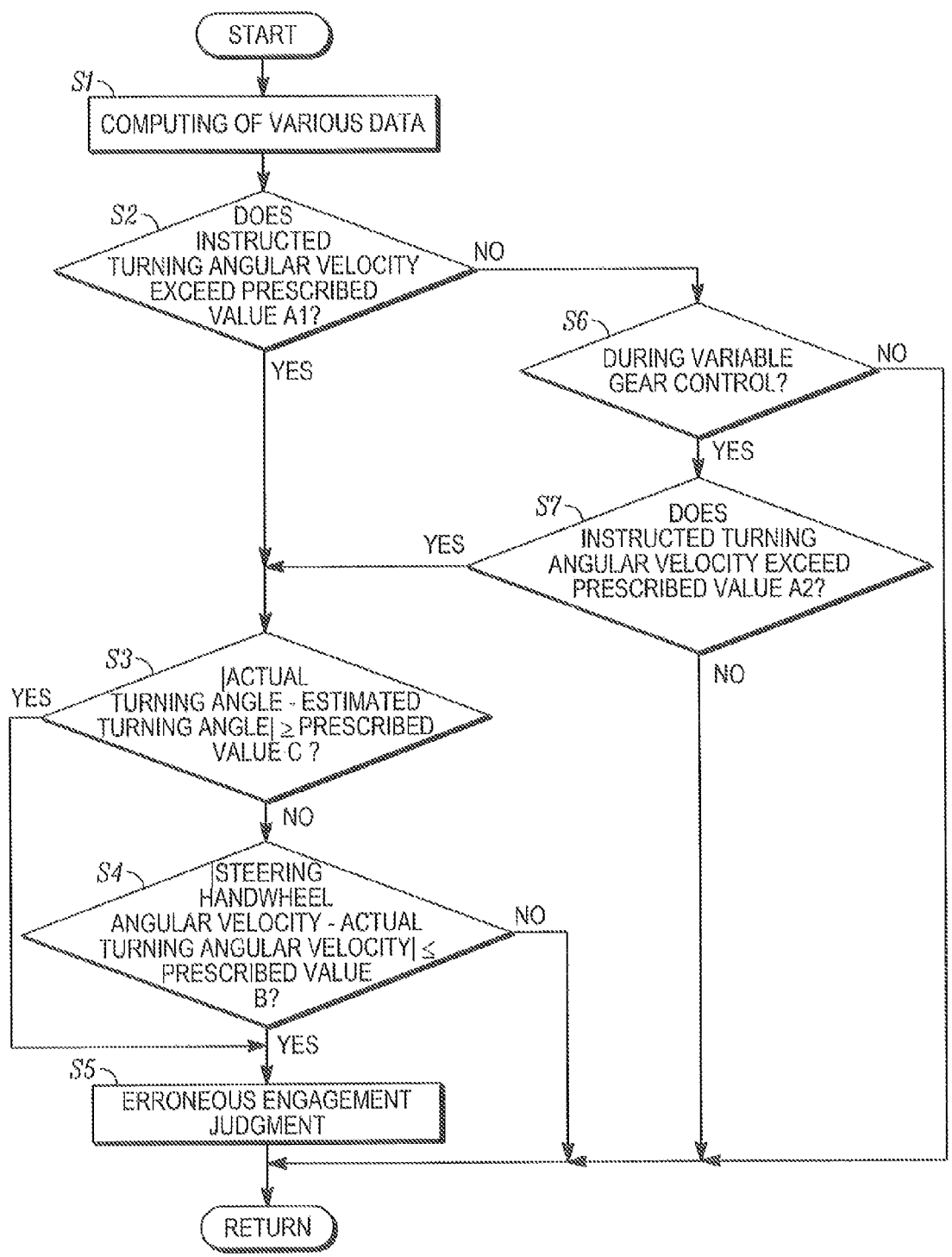
FIG. 3 is a flow chart illustrating the flow of clutch erroneous engagement determination control processing performed with reactive force controller 9 and turning controller 10 in the first embodiment.

FIG. 3 is a flow chart illustrating the flow of the clutch erroneous engagement determining processing performed with reactive force controller 9 and turning controller 10 in the first embodiment. This processing is performed during each SBW control operation period (for example, 5 msec) in each controller 9, 10.

In step S1 the various signals for use in the clutch engagement determination are computed, and process flow then goes to step S2. Because the various angular signals are used in the SBW control computing, there is no need to perform new computing. Computing of the instructed turning angular velocity, the actual turning angular velocity and the steering wheel angular velocity is performed.

In step S2 a query is made as to whether or not the instructed turning angular velocity meets or exceeds a prescribed value A1. If the instructed turning angular velocity meets or exceeds prescribed value A1 (that is, the answer is YES), flow continues to step S3. If the answer is NO, flow continues to step S6. This determination is performed to achieve switching of the clutch engagement determination method for cases in which the steering operation is performed at a speed higher than a prescribed level ($\geq$A1) and for all other cases. Here, steering wheel angular velocity can also be used in place of instructed turning angular velocity.

In step S3 a query is made as to whether the absolute value of the deviation between the actual turning angle and the estimated turning angle meets or exceeds prescribed value C. When the result is YES, flow continues to step S5. If the answer is NO, flow continues to step S4. Here, prescribed value C is set to correspond to the responsiveness of the turning motor control where C has a smaller value when the responsiveness is higher and a larger value when the responsiveness is lower. Also, when turning angle control is performed normally, because the actual turning angle corresponds to the nominal response characteristics, the estimated turning angle is taken as the nominal response characteristics.

In step S4 a query is made as to whether the absolute value of the deviation between the steering wheel angular velocity and the actual turning angular velocity is less than or equal to prescribed value B. When actual turning angular velocity is less than or equal to prescribed value B (i.e., the response is YES), flow continues to step S5 where it is judged whether the clutch is in the erroneous engagement state, and flow passes to return.

When actual turning angular velocity is greater than prescribed value B (i.e., the response is NO in step S4), flow passes to return (and the process starts again). Here, the prescribed value B is set taking into consideration the amounts of play and torsion in the steering system in the state of clutch 4 engagement. Also, the steering wheel angular velocity and the actual turning angular velocity are assumed to be equivalent quantities that allow computing the angular velocity of a given part as a function of the gear ratio.

As mentioned previously, when the instructed turning angular velocity is less than prescribed value A1 in step S2, processing advances to step S6. In step S6 a determination is made as to whether variable gear control is in effect. If YES, flow continues to step S7. If NO, flow passes to return.

In step S7 a determination is made as to whether or not the instructed turning angular velocity meets or exceeds a prescribed value A2 where A2<A1. If YES, flow continues to step S3. If NO, flow passes to return. Here, prescribed value A2 is set such that it is a smaller value when the additive steering quantity of the variable gear is larger so that there is a deviation between the steering wheel angular velocity and the actual turning angular velocity when the additive steering angle is supplied to the variable gear.

In the SBW system, if there is erroneous engagement of the backup clutch 4 during SBW control, normal SBW control is continued by means of the reactive force controller 9 and the turning controller 10. In the reactive force controller 9, the instructed turning angle is computed based on the steering wheel angle. In the turning controller 10, angle control is performed so that the actual turning angle tracks the instructed turning angle with the prescribed response characteristics (i.e., a nominal response).

Figure 4:
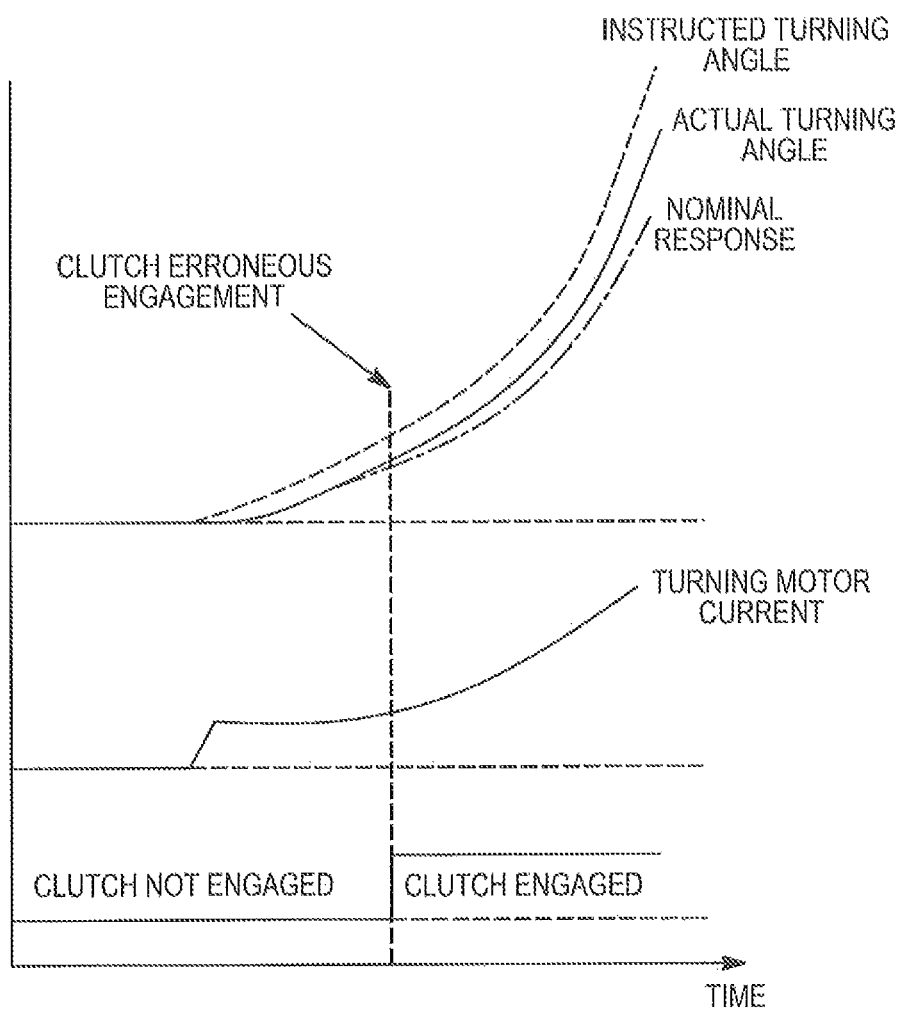
FIG. 4 is a diagram illustrating the state or condition of sticky steering in the event of backup clutch erroneous engagement.

In this case, because the steering wheel 1 and the steering mechanism 7 are connected to each other by means of a backup clutch 4, for example, even when the driver's hands leave the steering wheel, the steering wheel rotates together with the movement of the front wheels. As a result, the reactive force controller 9 computes the instructed turning angle based on the rotational angle of steering wheel 1. After receiving the instructed turning angle, the turning controller 10 controls the turning instructed motor current value such that the steering angle is further rotated. As a result, the steering wheel is rotated further. Consequently, as shown in FIG. 4, the deviation between the instructed turning angle and the actual turning angle is not reduced, the turning instructed motor current value rises, and even when the driver's hands are not on the steering wheel the steering wheel still continues to rotate.

On the other hand, in the vehicle steering controller in the first embodiment, a judgment is made as to whether backup clutch 4 is engaged based on the signal from steering angle sensor 2 and the signal from turning angle sensor 6.

When erroneous engagement of backup clutch 4 occurs during SBW control, and sticky steering takes place, the trend is different from that in the released state of backup clutch 4. More specifically, the steering amount is related to the turning amount, and in the released state (the normal state) of backup clutch 4, there is a prescribed deviation between the two quantities. On the other hand, in the engaged state of backup clutch 4, the steering wheel 1 and steering mechanism 7 and front wheels 8 match each other during operation, so that there is no specific deviation. That is, by determining the engagement state of backup clutch 4 according to the relationship between the manipulation amount or angular position of steering wheel 1 and the turning quantity or angular position of front wheels 8, without installing a new sensor or the like, it is possible to determine whether or not there is engagement of the backup clutch. Also, when engagement of the backup clutch is detected during SBW control, SBW control is stopped. As a result, the problem of sticky steering due to erroneous engagement of backup clutch 4 can be identified and resolved or improved. In this case, a scheme can also be adopted in which switching is performed from SBW steering control to assist steering control through backup clutch 4.

As shown in FIG. 3, when the instructed turning angular velocity is higher than or equal to prescribed value A1, and the deviation between the steering wheel angular velocity and the actual turning angular velocity is less than or equal to prescribed value B, the process flow in the flow chart shown in FIG. 3 is from step S1 to step S2 to step S3 to step S4 and then to step S5. The erroneous engagement state of the clutch is determined in step S5.

Figure 5:
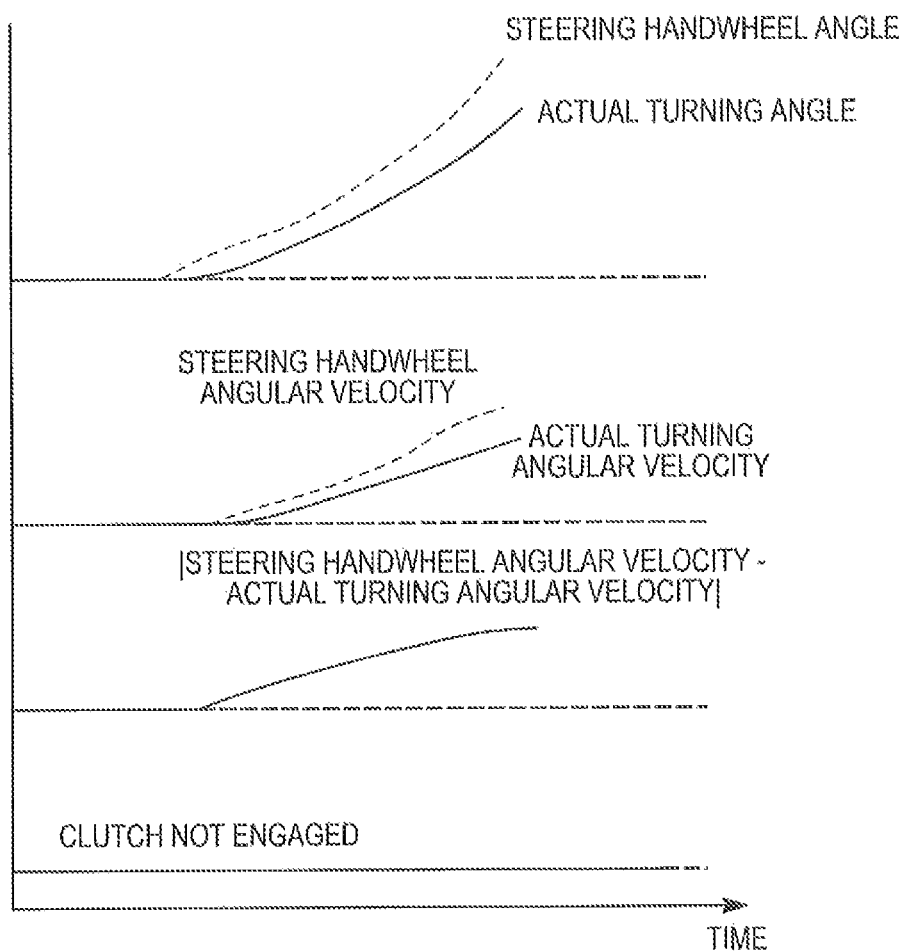
FIG. 5 is a time chart illustrating the relationship between the steering wheel angular velocity and the actual turning angular velocity when the backup clutch is released.
Figure 6:
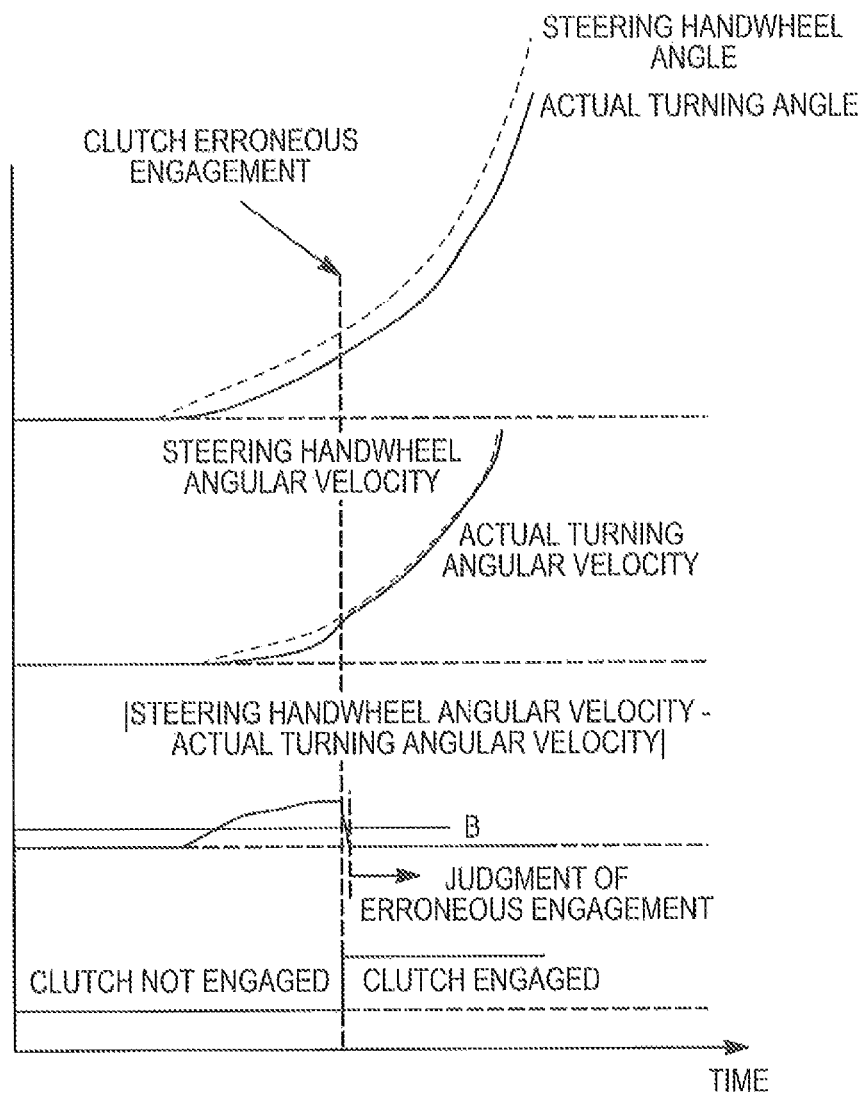
FIG. 6 is a time chart illustrating the backup clutch erroneous engagement determination operation corresponding to deviation between the steering wheel angular velocity and the actual turning angular velocity when the backup clutch is erroneously engaged.

As shown in FIG. 5, when the clutch 4 is not engaged a prescribed deviation occurs between the steering wheel angular velocity and the turning velocity taking into consideration the gear ratio of the steering gear (namely, when variable gear control is not performed, the steering wheel angular velocity is higher). On the other hand, as shown in FIG. 6, when the clutch is erroneously engaged both steering wheel 1 and front wheels 8 turn so that the deviation between the steering wheel angular velocity and the steering velocity, factoring in the gear ratio, becomes nearly zero. Consequently, the engagement state of backup clutch 4 is determinable based on the deviation in velocity. When the deviation between the steering wheel angular velocity and the actual turning angular velocity is less than or equal to prescribed value B, corresponding to the amounts of play and torsion in the steering system when the backup clutch is engaged, backup clutch 4 is engaged.

That is, by comparing the deviation between the steering wheel angular velocity and the actual turning angular velocity, which are different in the clutch engaged state and in the clutch released state, it is possible to detect the information about tracking delay of the amount front wheels 8 are turned with respect to the manipulation amount or angular position of steering wheel 1. Hence, it is possible to determine the engagement state of backup clutch 4 more accurately.

When the instructed turning angular velocity is equal to or exceeds prescribed value A1, and the deviation between the estimated turning angle and the actual turning angle is equal to or greater than prescribed value C, process flow in the flow chart of FIG. 3 goes from step S1 to step S2 to step S3 and then to step S5, where it is determined whether the clutch 4 is in the erroneous engagement state.

Figure 7:
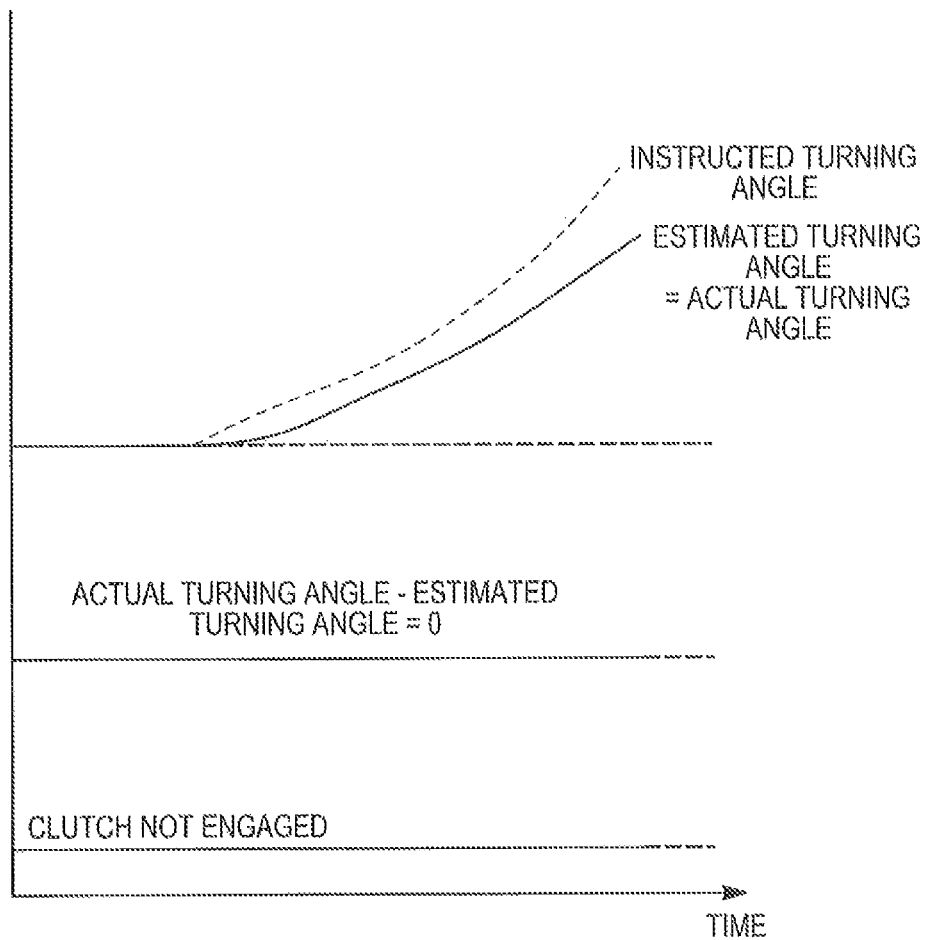
FIG. 7 is a time chart illustrating the relationship between the actual turning angle and the estimated turning angle when the backup clutch is released.
Figure 8:
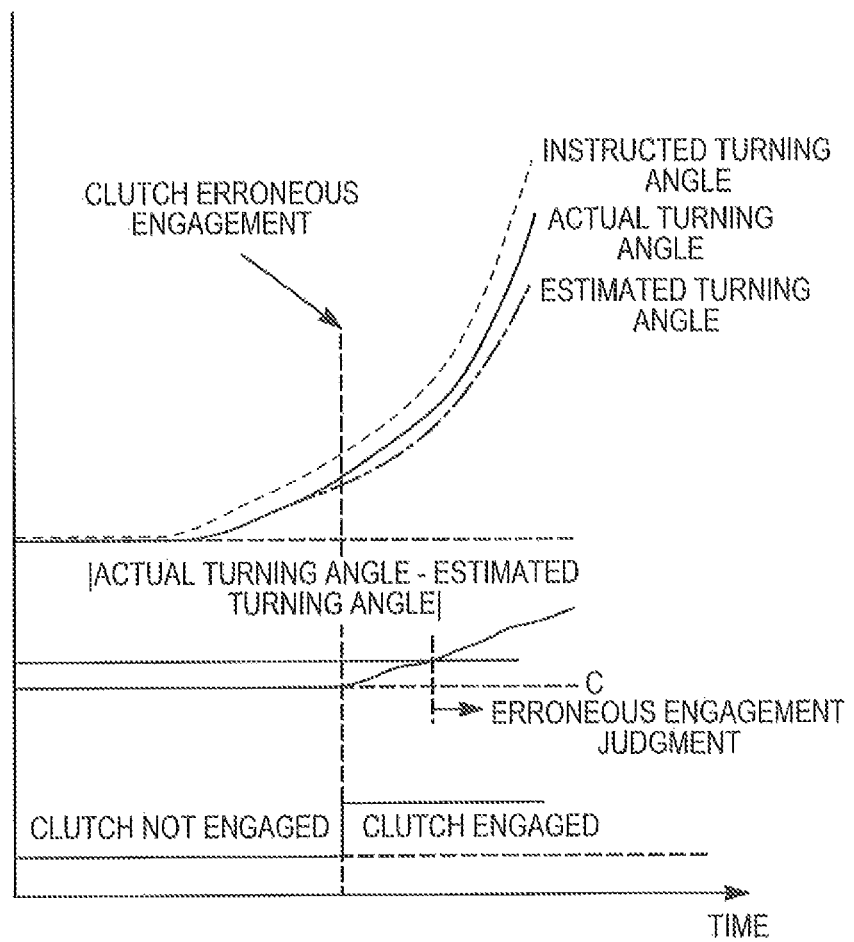
FIG. 8 is a time chart illustrating the backup clutch erroneous engagement determining operation corresponding to deviation between the actual turning angle and the estimated turning angle in the event of backup clutch erroneous engagement.

The estimated turning angle, which is estimated from the instructed turning angle computed according to the manipulation amount of steering wheel 1, is the value derived according to the response characteristics set with the control logic and the response characteristics of the actual steering mechanism 7. As shown in FIG. 7, in the normal state the estimated turning angle and the actual turning angle match each other. On the other hand, when the clutch 4 is erroneously engaged steering wheel 1 and front wheels 8 rotate together independently of the control state. The estimated turning angle and the actual turning angle do not match each other, and the deviation between the two angles increases as shown in FIG. 8. As a result, it is possible to determine the engagement state of backup clutch 4 based on this deviation. When the deviation between the estimated turning angle and the actual turning angle meets or exceeds the prescribed value C corresponding to the responsiveness of the turning actuator control, the clutch engagement determination part determines the engagement state of backup clutch 4.

That is, by comparing the deviation between the estimated turning angle and the actual turning angle, which are different in the clutch engaged state and in the clutch released state, it is possible to detect the information about the tracking delay of front wheels 8 with respect to the manipulation amount of steering wheel 1. Also, it is possible to more accurately determine the engagement state of backup clutch 4, including the erroneous engagement state.

In the event of a quick steering operation (when the instructed turning angular velocity meets or exceeds prescribed value A1), the actual turning angle tracks the steering wheel angle with a certain delay. This is due to tracking with nominal response characteristics set according to the capability of steering mechanism 7. In the clutch 4 engaged state, the steering wheel angle and actual turning angle are forced to move in concert. Consequently, the actual turning angle has a trend different from the nominal response characteristics. Because the steering wheel angular velocity and the actual turning angular velocity have the same trend, the deviation between the two angular velocities becomes nearly zero (smaller than prescribed value B), and the state is determined to be a clutch erroneous engagement state. Also, because the actual turning angle and the estimated turning angle are separated from each other the deviation between the two angles becomes larger (equal to or greater than prescribed value C), and it is judged that clutch is in the erroneous engagement state.

When the instructed turning angular velocity is lower than prescribed value A1, and variable gear control is performed, process flow in the flow chart of FIG. 3 goes from step S1 to step S2 to step S6 to step S7 and then to step S3. Determination of the engagement state of backup clutch 4 is made in steps S3 and S4.

During variable gear control, the gear ratio between the steering wheel angle and the actual turning angle is not constant. Consequently, the angular velocities and angles equivalent to the gear ratio do not match each other. However, when backup clutch 4 is in the engaged state the angular velocities of the two nearly match each other because steering wheel 1 and the actual turning angle move at the mechanically fixed gear ratio. Also during variable gear control, it is possible to achieve a more reliable determination of the clutch engagement state because the various values serving as standards for the judgment of clutch engagement in the normal state and clutch erroneous engagement state are significantly different from each other.

Figure 9:
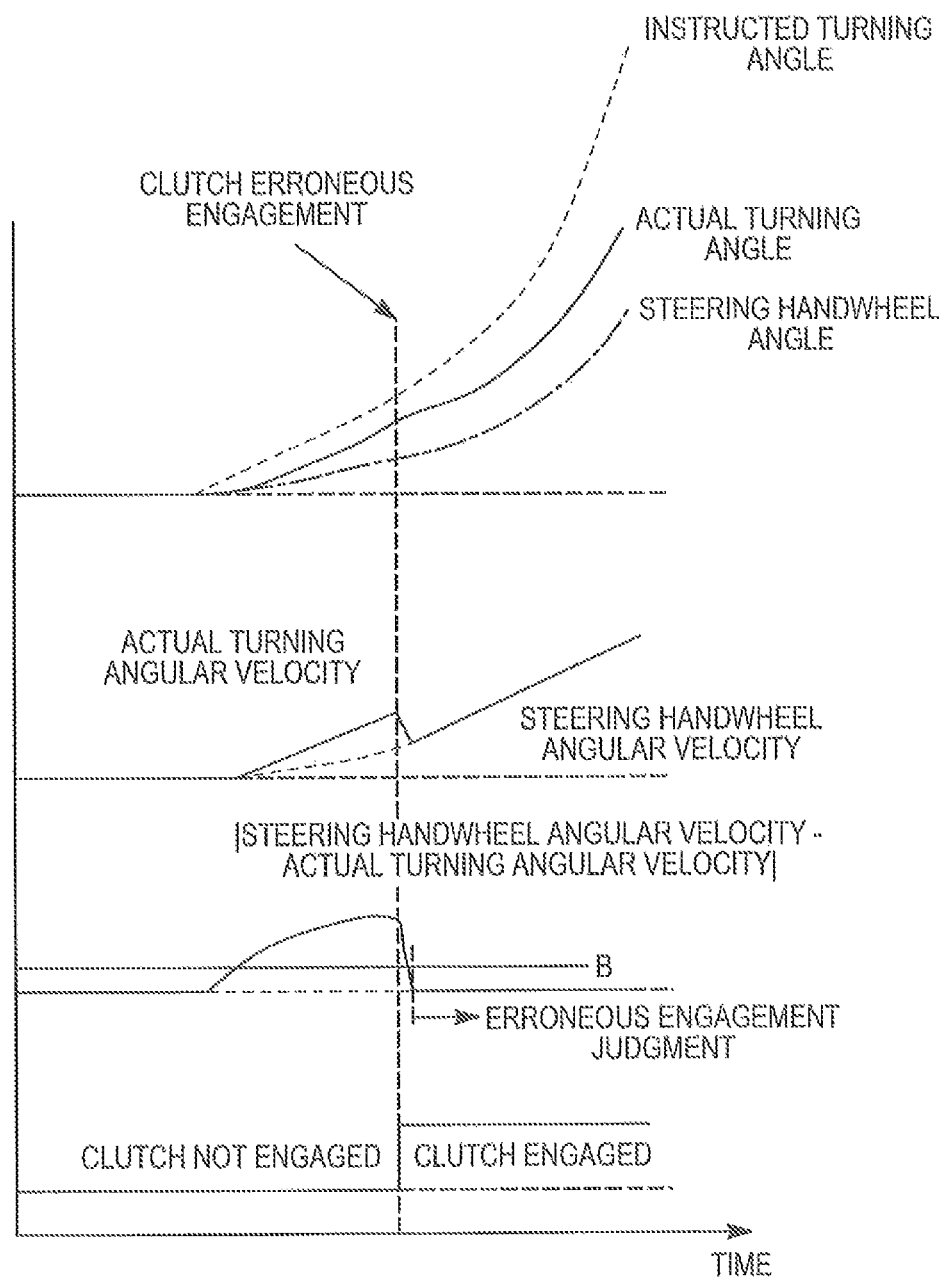
FIG. 9 is a time chart illustrating the backup clutch erroneous engagement determination operation in the case of backup clutch release during variable gear control.
Figure 10:
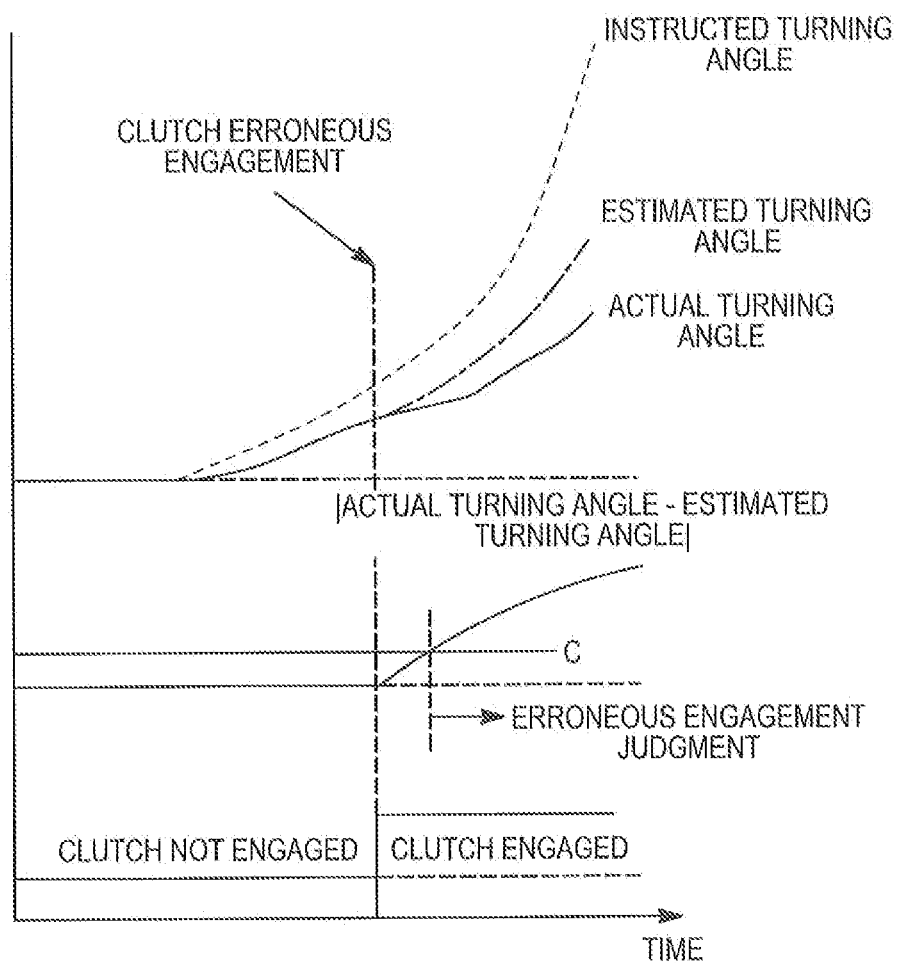
FIG. 10 is a second time chart illustrating the backup clutch erroneous engagement determination operation in the case of backup clutch erroneous engagement during variable gear control.

For example, in the case of control with the instructed turning angle set to be greater or larger than the steering wheel angle, the actual turning angle tracks the instructed turning angle according to the prescribed nominal response characteristics. Hence, the actual turning angle changes faster than the steering wheel angle. In this case, when the clutch 4 is engaged the actual turning angle displays the same trend as that of the steering wheel angle, so that the difference between the two angular velocities becomes smaller (nearly zero). Consequently, as shown in FIG. 9, the condition of step S4 shown in FIG. 3 (that is, the deviation between the steering wheel angular velocity and the actual turning angular velocity is less than or equal to prescribed value B) is met. Also, due to the clutch engagement the actual turning angle is pulled toward the steering wheel angle, and deviation in the nominal response characteristics (estimated turning angle) occurs. Consequently, as shown in FIG. 10, the condition of step S3 (that is, the deviation between the actual turning angle and the estimated turning angle exceeds prescribed value C) is met. This is also true in the case of control when the instructed turning angle is set smaller than the steering wheel angle.

In this way, because the deviation between the steering wheel angle and the actual turning angle is large during variable gear control, it is still possible to determine the engagement state of the clutch in steps S3 and S4 even when the instructed turning angular velocity is low (lower than prescribed value A1). Here, when the steering wheel angular velocity is nearly zero (smaller than prescribed value A2), it is difficult to judge clutch engagement in steps S3 and S4 so that clutch engagement determination is not performed when the instructed turning angular velocity is smaller than prescribed value A2.

The first embodiment has a variable turning control part or means that performs variable gear control in which the ratio of the turning amount of front wheels 8 to the manipulation amount or angular position of steering wheel 1 changes when backup clutch 4 is in the released state. The clutch engagement determination part or means determines the engagement of backup clutch 4 when variable gear control is performed.

That is, it is possible to determine erroneous engagement of backup clutch 4 more accurately by performing the clutch engagement determination process during variable gear control because the relationship between steering wheel 1 and the actual turning angle in the clutch engaged state and that in the released state are different from each other.

For the vehicle steering controller in the first embodiment, there are several effects. First, a determination is made as to whether or not backup clutch 4 is engaged based on the signal from steering angle sensor 2 and the signal from turning angle sensor 6. As a result, it is possible to detect the engagement of the backup clutch 4 without installing new sensors or the like.

In this embodiment, a judgment is made as to whether backup clutch 4 is engaged when it is interlocked to the operation of either steering wheel 1 or steering mechanism 7 and based on the operating characteristics of the other of these parts generated as a result of the interlocking. By this construction, it is possible to correctly determine whether the operation of the steering wheel 1 and that of steering mechanism 7 match each other.

Whether backup clutch 4 is engaged is determined based on information about the tracking delay between steering wheel 1 and steering mechanism 7 in the first embodiment. With this construction, it is possible to correctly judge whether the operation of steering wheel 1 and that of steering mechanism 7 match each other.

As a second effect, when the deviation between the steering wheel angular velocity and the actual turning angular velocity is equal to or smaller than prescribed value B indicating the backup clutch engaged state, the clutch engagement determination part or means determines that the backup clutch 4 is in the engaged state. As a result, it is possible to more accurately determine the engagement state of backup clutch 4, including the erroneous engagement state.

Thirdly, when the deviation between the estimated turning angle and the actual turning angle meets or exceeds prescribed value C corresponding to the responsiveness of the turning actuator control, the clutch engagement determination part determines that the backup clutch 4 is in the engaged state. Hence, it is possible to judge the engagement state of backup clutch 4 more accurately.

According to a fourth effect, a variable turning control part or means is provided for performing variable gear control in which the ratio of the turning amount of front wheels 8 to the manipulation amount of steering wheel 1 when backup clutch 4 is in the released state changes. The clutch engagement determination part determines the engagement of backup clutch 4 when variable gear control is performed, so that it is possible to more accurately determine the engagement state of backup clutch 4, including the erroneous engagement state.

In a second embodiment, clutch engagement determination is performed when movement of the steering wheel 1 or wheels 8 is hindered. Because the overall construction is the same as that in the first embodiment, the explanation and the corresponding figures will not be presented again.

Figure 11:
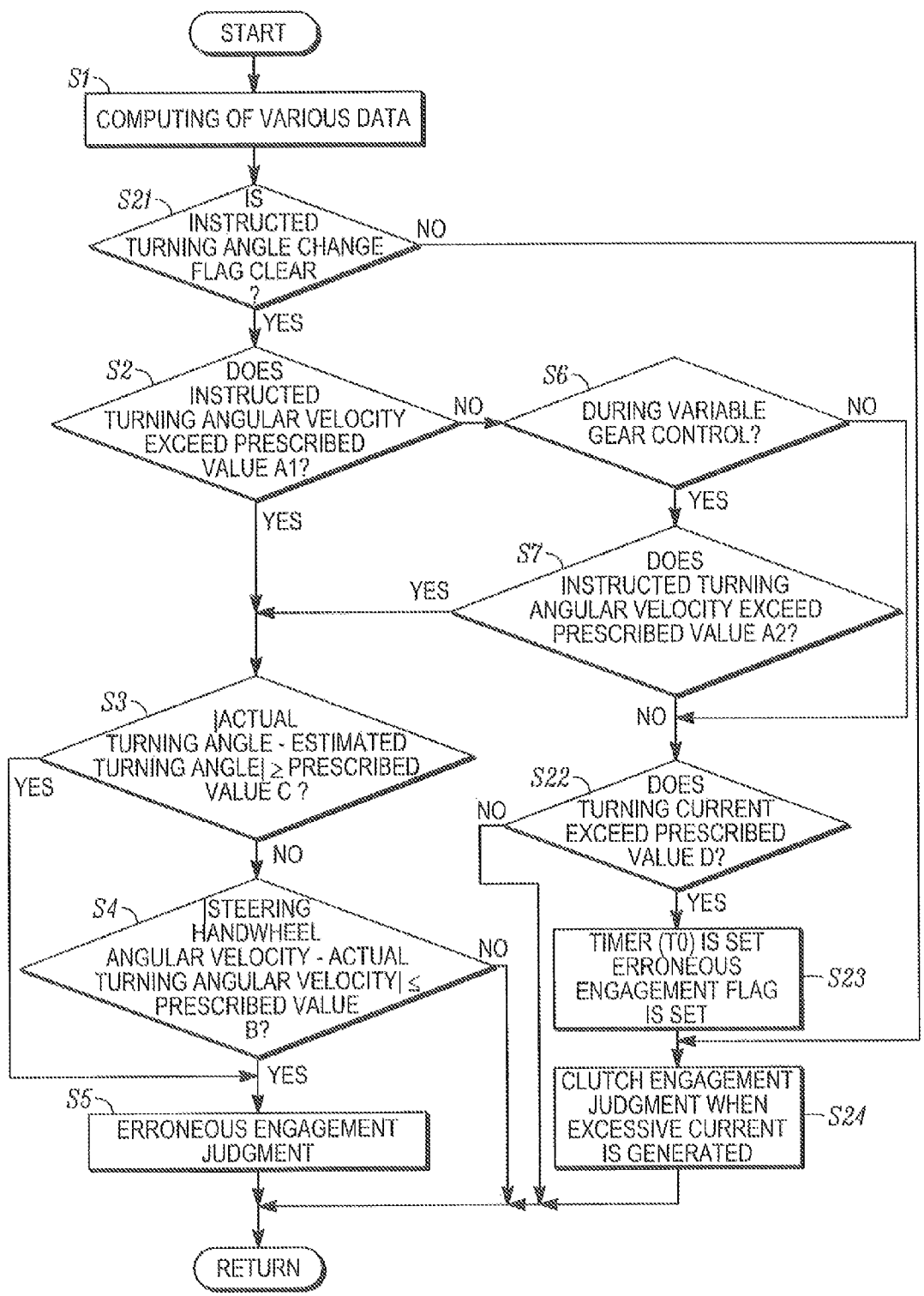
FIG. 11 is a flow chart illustrating the flow of the backup clutch erroneous engagement determination control processing performed with reactive force controller 9 and turning controller 10, respectively, in a second embodiment.

FIG. 11 is a flow chart illustrating the flow of the clutch erroneous engagement determination processing performed in reactive force controller 9 and turning controller 10 in the second embodiment of the invention. For process steps that are the same as those in the first embodiment, the same step numbers will be adopted and not be explained again.

In step S21 a query is made as to whether or not an instructed turning angle change flag has been cleared. If YES, flow continues to step S2. If NO, flow continues to step S24. The instructed turning angle change flag is set when the instructed turning angle is changed during the clutch engagement determination when an excessive current is generated in the turning motor. This will be elaborated in more detail hereinafter.

In step S22 a query is made as to whether the turning current exceeds a prescribed value D. If YES, the turning current exceeds prescribed value D, flow continues to step S23. If NO, flow passes to return. Prescribed value D is set at a value that does not occur when the vehicle runs over conventional bumps (ruts) during normal operation, and occurs only when the movement of the wheels is hindered when hitting a curb or the like.

In step S23 the timer for counting the time for performing clutch engagement determination in cases when there is an excessive current in the turning motor is set at prescribed time T0. At the same time the erroneous engagement flag is set, and flow continues to step S24. The prescribed time T0 is set as the time when there is a deviation larger than prescribed value B between the steering wheel angular velocity and the actual turning angular velocity due to a change in the instructed turning angle when the clutch 4 is released. That is, when the erroneous engagement flag set in step S23 is not cleared during prescribed time T0, it is determined after prescribed time T0 has elapsed that erroneous clutch engagement is occurring. Also, if prescribed time T0 is long, it takes a long time to perform the judgment. In addition, the effect on the behavior of the vehicle becomes significant. Prescribed time T0 is set at about ten ms for example. Other set times for T0 may be used.

In step S24 the clutch engagement determination processing when there is excessive current is performed, and process flow then passes to return.

Figure 12:
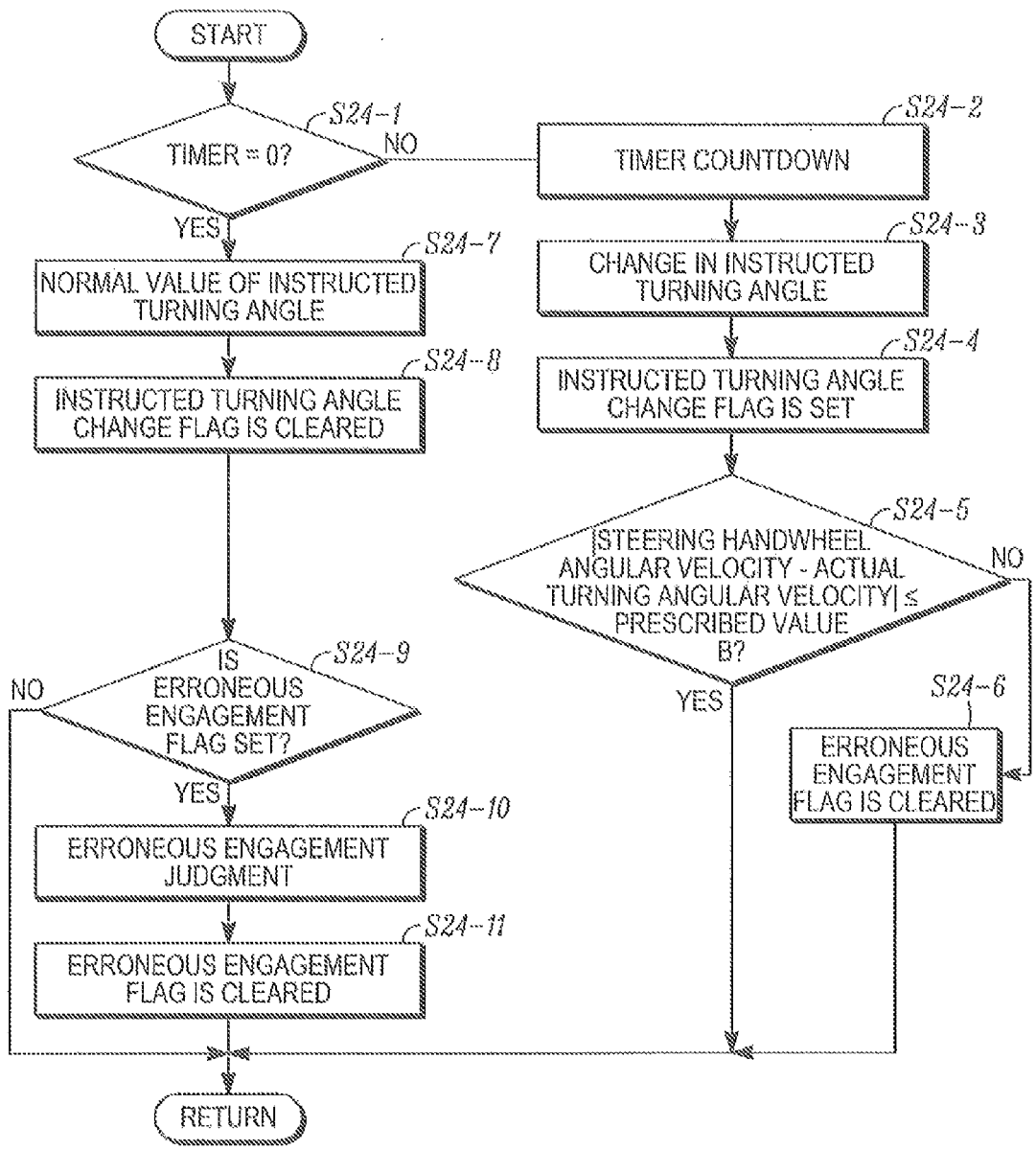
FIG. 12 is a flow chart illustrating the flow of the backup clutch engagement determination processing when there is excessive current flow.

FIG. 12 is a flow chart illustrating the flow of the clutch engagement determination processing when there is excessive current in step 24 of FIG. 11. In step S24-1 a query is made as to whether the timer value set in step S23 is zero. When the timer value is not zero (i.e., the answer is NO), flow continues to step S24-2 where a conclusion is reached that the timer is counting down. Flow continues to step S24-3.

In step S24-3 a change of the instructed turning angle is made, and flow continues to step S24-4 (instructed turning angle changing part or means). As the change in the instructed turning angle, a change is performed in the direction whereby the prescribed amount for the instructed turning angle approaches zero, that is, in the direction of resetting the actual turning angle with respect to the instructed turning angle before the change.

In step S24-4 the instructed turning angle change flag is set, and flow continues to step S24-5. During the period when the instructed turning angle flag is set, that is, during prescribed time T0, the clutch engagement determination processing when there is excessive current in the turning motor of process step S24 is continued. This can prevent the problem of stopping processing halfway through the determination in the determination processing accompanying the change in the instructed turning angle.

In step S24-5 a query is made as to whether or not the absolute value of the deviation between the steering wheel angular velocity and the actual turning angular velocity is equal to or smaller than prescribed value B. If YES, flow passes to return. In contrast, if the absolute value of the deviation between the steering wheel angular velocity and the actual turning angular velocity is greater than prescribed value B, flow continues to step S24-6. Here, just as in the first embodiment, prescribed value B is set taking into consideration the amount of play and torsion in the steering system in the clutch engaged state, and this is a small value near zero. Also, the steering wheel angular velocity and the actual turning angular velocity are converted to equivalent values that allow computing the angular velocities at a given point with the gear ratio being taken into consideration.

In step S24-6 a query is made as to whether the clutch is released (no erroneous engagement state), the erroneous engagement flag is cleared, and flow passes to return.

Returning now to step S24-1, when the timer value is zero (i.e., the answer to the query therein is YES), flow continues to step S24-7 where a conclusion is reached that the timer is counted down (i.e., prescribed time T0 has elapsed). Because of this, the instructed turning angle changed in step S24-3 is reset to the value before the change (the normal value), and flow continues to step S24-8.

In step S24-8 the instructed turning angle change flag set in step 24-4 is cleared, and flow continues to step S24-9 where a determination is made as to whether an erroneous engagement flag is set. If the flag is not set, flow passes to return. If the flag is set, flow continues to step S24-10.

In step S24-10 a determination is made as to whether the clutch is in an erroneous engagement state. Flow then continues to step S24-11 where the erroneous engagement flag is cleared, and flow passes to return.

In the flow chart of FIG. 11, when the driver holds steering wheel 1, flow goes from step S1 to step 21 to step S2 to step S6 to step S7 to step S22 to step S23 and then to step S24. In step S24 clutch engagement determination processing is performed when an excessive current is generated. Also, when for example front wheels 8 hit a curb, flow goes from step S1 to step S21 to step S2 to step S6 to step S22 to step S23 and then to step S24. Then, in the clutch engagement determination processing when excessive current is generated in step S24, flow goes from step S1 to step S21 and then back to step S24, and this flow is repeated until the instructed turning angle change flag is cleared.

In the clutch engagement determination processing when excessive current is generated in step S24, until prescribed time T0 has elapsed, flow in the flow chart of FIG. 12 goes from step S24-2 to step S24-3 to step S24-4 and then to step S24-5, and the flow repeats. In step S24-3, the instructed turning angle is changed in the direction towards zero.

Here, because front wheels 8 move in the resetting direction with respect to the fixed state of steering wheel 1 when backup clutch 4 is in the released state, until prescribed time T0 has elapsed a query is made in step S24-5 as to whether the deviation between the steering wheel angular velocity and the actual turning angular velocity meets or exceeds prescribed value B. If so, flow goes from step S24-5 to step S24-6, and the erroneous engagement flag is cleared.

On the other hand, when backup clutch 4 is erroneously engaged steering wheel 1 and front wheels 8 move in concert. Hence, during prescribed time T0 the state continues in which the deviation between the steering wheel angular velocity and the actual turning angular velocity is lower than prescribed value B, and the erroneous engagement flag is kept set as is.

After prescribed time T0 has elapsed, flow goes from step S24-1 to step S24-7 to step S24-8 and then to step S24-9. When backup clutch 4 is in the released state, flow goes from step S24-9 to return. On the other hand, when backup clutch 4 is in the erroneous engagement state, flow goes from step S24-9 to step S24-10 and then to step S24-11. In step S24-10 it is judged that backup clutch 4 is in the erroneous engagement state.

Figure 13:
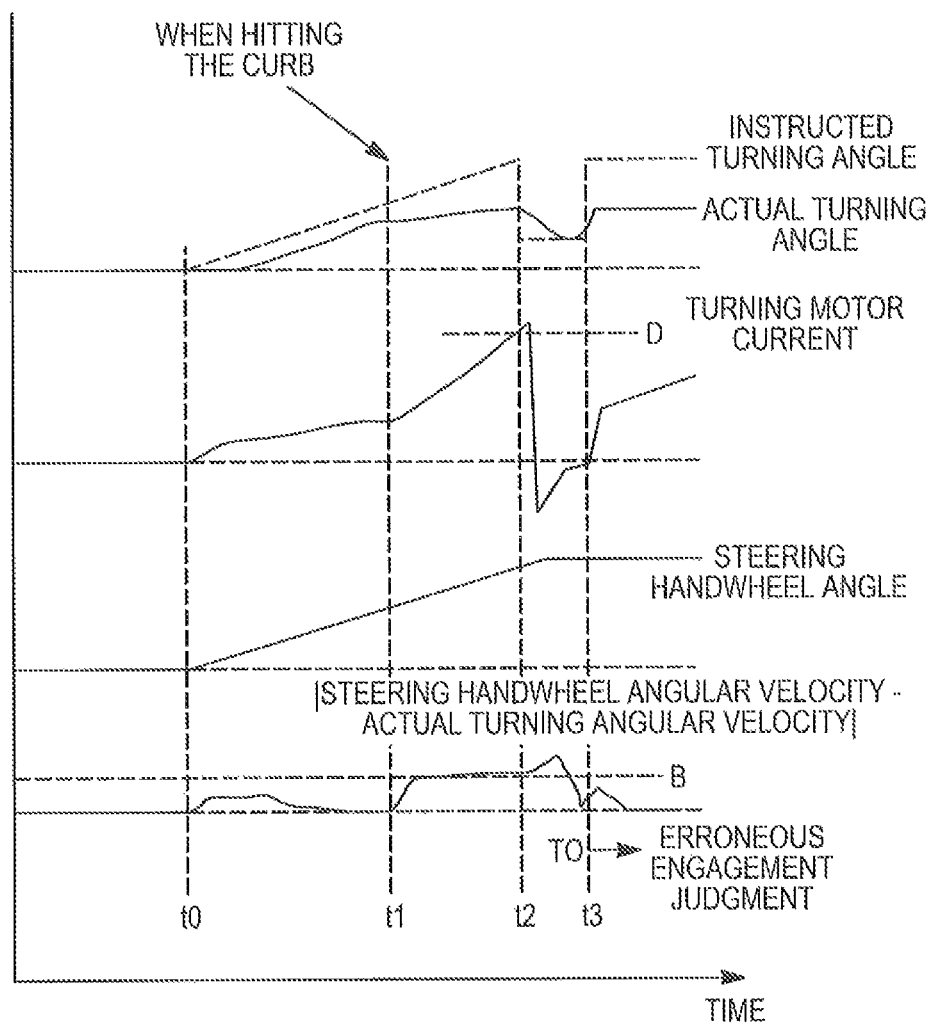
FIG. 13 is a time chart illustrating the backup clutch engagement determination operation when, for example, the vehicle wheels hit a curb while the backup clutch is released.

FIG. 13 is a time chart illustrating the clutch engagement determination operation when the wheels hit a curb while backup clutch 4 is in the released state.

At time t0 the driver starts turning steering wheel 1. At time t1 the wheels hit the curb, and it is not possible to turn front wheels 8 further in the turning direction. During time t1-t2, the driver turns steering wheel 1 further while front wheels 8 do not turn. In this case, there is no change in the actual turning angle although the instructed turning angle is increased corresponding to the steering wheel angle. As a result, the control current of turning motor 5 is increased to reduce the deviation between the instructed turning angle and the actual turning angle.

At time t2 clutch engagement determination processing is started when the excessive current is generated because the control current of turning motor 5 exceeds prescribed value D. In this processing, the instructed turning angle is changed in the direction towards zero as the prescribed quantity, that is, in the direction of resetting the actual turning angle. Due to changes in the instructed turning angle, the actual turning angle tracks with the nominal response characteristics during the period t2-t3. In this case, because backup clutch 4 is in the released state the trend of the actual turning angle has no influence on the steering wheel angle. As a result, the deviation between the steering wheel angular velocity and the actual turning angular velocity gradually increases, and the deviation between the steering wheel angular velocity and the actual turning angular velocity exceeds prescribed value B.

Because the deviation between the steering wheel angular velocity and the actual turning angular velocity exceeds prescribed value B during prescribed time T0 of t2-t3, at time t3 it is judged that the clutch is in the released state.

Figure 14:
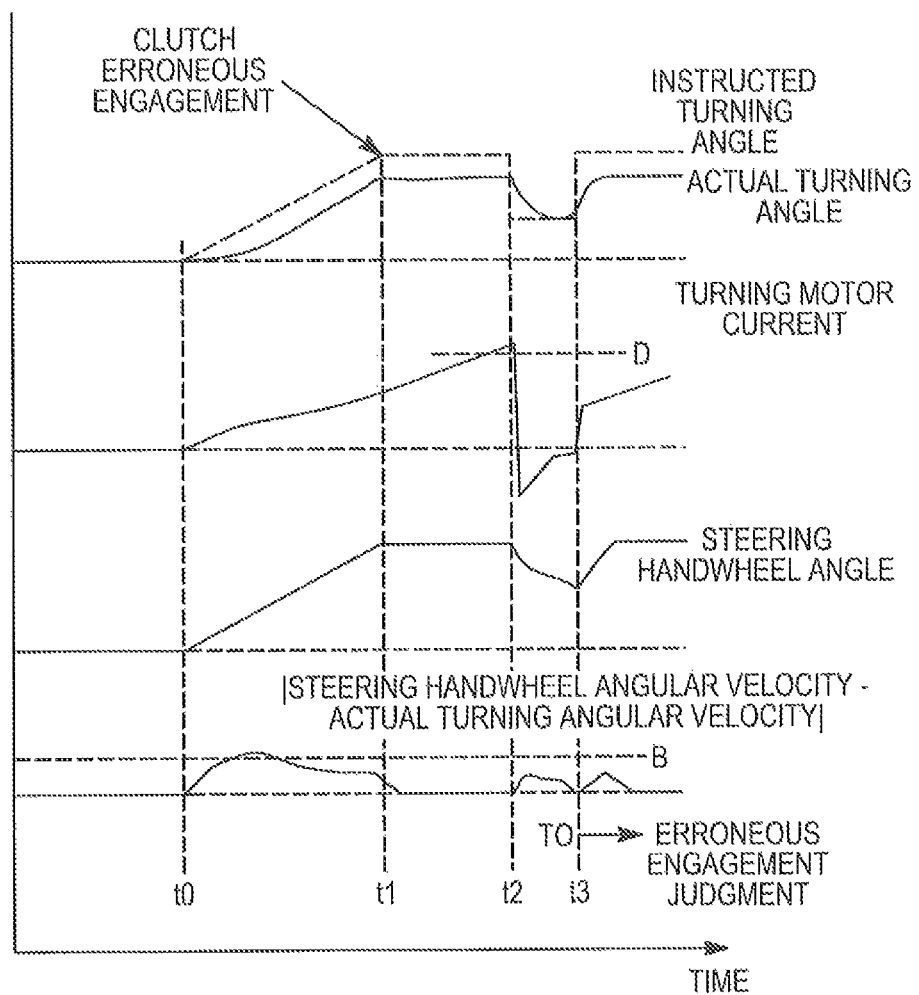
FIG. 14 is a time chart illustrating the backup clutch engagement determination operation when, for example, the vehicle wheels hit a curb while backup clutch is in the erroneous engagement state.

FIG. 14 is a time chart illustrating the clutch engagement determination operation when the wheels hit a curb while backup clutch 4 is in the erroneous engagement state.

Because the chart is the same as that in FIG. 13 during time t0-t1, this part is not explained again.

At time t1 backup clutch 4 is erroneously engaged. During time t1-t2 the instructed turning angle is also fixed because steering wheel 1 is fixed. In this case, the control current of turning motor 5 rises so that the deviation between the instructed turning angle and the actual turning angle is reduced.

At time t2, because the control current of turning motor 5 exceeds prescribed value D, clutch engagement determination processing is started at the time of excessive current generation when the instructed turning angle is changed in the direction approaching zero as the prescribed value, that is, in the direction of resetting the actual turning angle. During t2-t3 the actual turning angle tracks with the nominal response characteristics due to changes in the instructed turning angle. In this case, the steering wheel angle also varies corresponding to the trend of the actual turning angle because backup clutch 4 is in the engaged state. Consequently, the steering wheel angle and the actual turning angle change in the same way, and the deviation between the steering wheel angular velocity and the actual turning angular velocity does not meet or exceed prescribed value B.

At time t3 it is judged that the clutch is in erroneous engagement because the deviation between the steering wheel angular velocity and the actual turning angular velocity is not greater than prescribed value B during prescribed time T0 of t2-t3.

In the second embodiment the turning actuator device has turning motor 5 that applies the turning torque to steering mechanism 7, and there is an instructed turning angle changing means or part (step S24-3) that supplies the prescribed change quantity to the instructed turning angle corresponding to the manipulation state of steering wheel 1 when the current value of turning motor 5 exceeds prescribed value D, indicating that the turning of front wheels 8 is hindered. When the prescribed change quantity is applied to the instructed turning angle by the instructed turning angle changing part, the clutch engagement determination part (see FIG. 11) determines whether backup clutch 4 is engaged.

When backup clutch 4 is erroneously engaged, and the driver holds steering wheel 1 and suppresses rotation of steering wheel 1, the deviation between the steering wheel angular velocity and the actual turning angular velocity becomes zero or a small value. The deviation between the estimated turning angle and the actual turning angle is also small. Consequently, determination of the clutch engagement state may not be performed correctly.

In the second embodiment, the control current of turning motor 5 is increased so as to reduce the deviation between the instructed turning angle and the actual turning angle. Here, when the control current of turning motor 5 exceeds prescribed value D, the instructed turning angle is changed within a prescribed time, and the clutch engagement determination is performed at this time. As a result, it is still possible to perform the clutch engagement determination more accurately even when the driver holds the direction with steering wheel 1, or even when the wheels hit a curb. Also, because clutch engagement determination is performed based on the control current of turning motor 5 when holding the direction with steering wheel 1 or hitting the wheels against a curb, the cost can be cut since there is no need for a torque sensor in contrast to a method in which a torque sensor is used to estimate the state of holding the direction with the steering wheel and then performing the clutch engagement determination.

In the second embodiment the instructed turning angle changing part or means applies a change quantity in the resetting direction to the instructed turning angle until prescribed time T0 has elapsed.

When the instructed turning angle is changed in the direction to increase the actual turning angle, the influences of the reactive force of the road surface and the force applied by the drive in holding the direction of the steering wheel, etc., may create a situation in which the steering angle can hardly be changed. The clutch engagement determination based on the instructed turning angle or the actual turning angle may be incorrect in such a situation. By changing the instructed turning angle so that the actual turning angle is changed from the turning direction toward the resetting direction, it is possible to perform clutch engagement determination more accurately.

For the vehicle steering device in the second embodiment, there are the following effects in addition to the effects described with respect to the first embodiment.

First, the turning actuator has turning motor 5 that outputs a turning torque to steering mechanism 7. There is an instructed turning angle changing part (step S24-3) that supplies a prescribed change quantity to the instructed turning angle corresponding to the manipulation state of steering wheel 1 when the current value of turning motor 5 exceeds prescribed value D, which indicates the state in which turning of front wheels 8 is hindered. Because the clutch engagement determination part (see FIG. 11) judges the engagement state of backup clutch 4 when a prescribed change quantity is imparted to the instructed turning angle by the instructed turning angle changing part, it is still possible to judge clutch engagement more accurately even if the driver holds the steering direction of steering wheel 1 or the wheels hit a curb.

During prescribed time T0 the instructed turning angle changing part or means changes the instructed turning angle in the resetting direction so that it is possible to suppress the influence of the reactive force of the road surface, etc., which enables the clutch engagement determination to be performed more accurately.

In a third embodiment, as clutch erroneous engagement takes place when the steering wheel angular velocity exceeds the value for generation of a deviation between the actual turning angle and the estimated turning angle, the clutch engagement determination is performed only with the deviation between the actual turning angle and the estimated turning angle. Also, since the overall construction is the same as that of the first embodiment, the explanation and figures will not be repeated.

Figure 15:
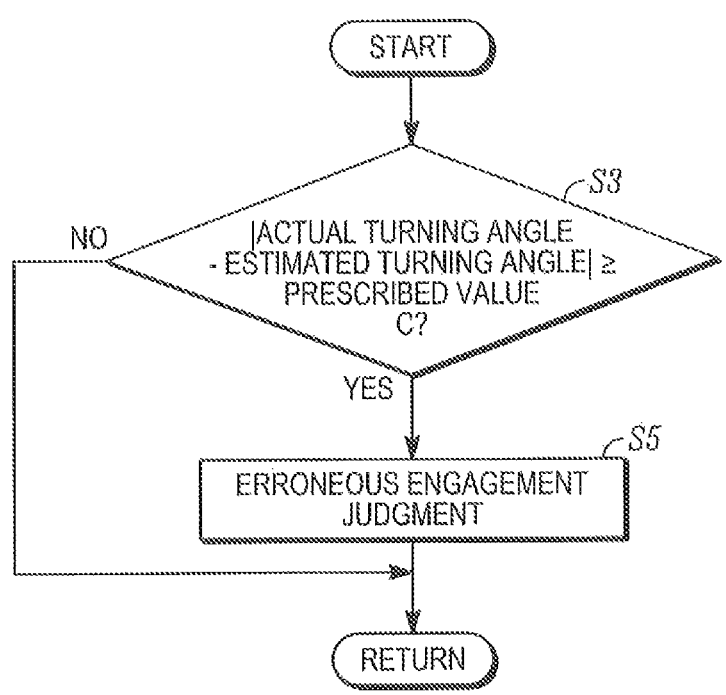
FIG. 15 is a flow chart illustrating the flow of the backup clutch erroneous engagement determination processing performed with reactive force controller 9 and turning controller 10 in the third embodiment.

FIG. 15 is a flow chart illustrating the flow of the clutch erroneous engagement control processing performed with reactive force controller 9 and turning controller 10 in the third embodiment. This control processing is for the case of the generation of clutch erroneous engagement only when the steering wheel angular velocity exceeds a value that can be determined. In step S3, a query is made as to whether the deviation between the actual turning angle and the estimated turning angle meets or exceeds prescribed value C. When it does, it is judged in step S5 that there is clutch erroneous engagement.

When there is clutch erroneous engagement, and the driver removes its hands from steering wheel 1, a self-steering state ensues. Steering wheel 1 is rotated. In this case, it is possible to perform the clutch engagement determination based on the deviation between the actual turning angle and the estimated turning angle, just as in the third embodiment, because the steering wheel angular velocity is high, and the change in the steering wheel angle is also large.

When the driver does not completely remove its hands from steering wheel 1, but instead lightly holds the steering wheel (in the normal running state), there is variation in the steering wheel angular velocity. In this case, it is difficult to perform the clutch engagement determination from the deviation between the actual turning angle and the estimated turning angle. As a result, the clutch engagement determination is performed based on the deviation between the steering wheel angular velocity and the actual turning angular velocity. Judgment based on the angle can be performed in the region with a high steering wheel angular velocity.

As explained above, the same first and third effects in the first embodiment can be realized with the vehicle steering controller of the third embodiment.

In a fourth embodiment, the determination of clutch engagement is performed based on the deviation between the steering wheel angular velocity and the actual turning angular velocity when clutch erroneous engagement occurs even when the steering wheel angular velocity is low. Because the overall construction is the same as that of the first embodiment, the figures and explanation will not be presented again.

Figure 16:
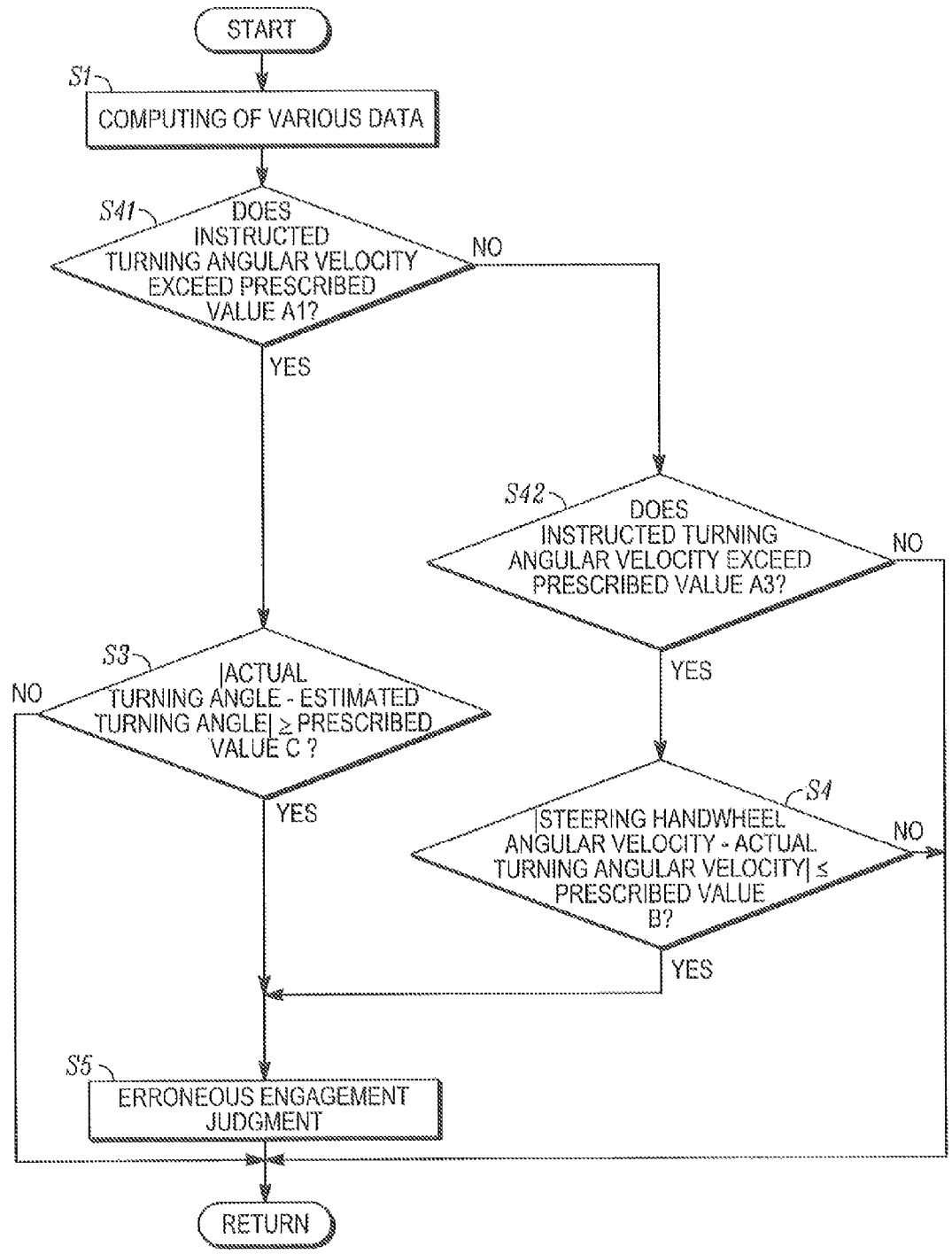
FIG. 16 is a flow chart illustrating the flow of the backup clutch erroneous engagement determination processing performed with reactive force controller 9 and turning controller 10 in a fourth embodiment.

FIG. 16 is a flow chart illustrating the flow of the clutch erroneous engagement determination processing performed with reactive force controller 9 and turning controller 10 in the fourth embodiment. Since the same step numbers as those in the first embodiment are adopted, these duplicate steps are not explained again.

In step S41 a query is made as to whether the instructed turning angular velocity exceeds prescribed value A0. If YES, flow continues to step S3. If NO, flow continues to step S42. Prescribed value A0 can be, for example, set at a speed at which the clutch engagement determination can be performed reliably based on the angle, that is, when a sufficient deviation between the steering wheel angle and the nominal response characteristics (estimated turning angle) is generated.

In step S42 a query is made as to whether the instructed turning angular velocity exceeds a prescribed value A3, where A3<A0. If YES, flow continues to step S4. If NO, flow passes to return. Prescribed value A3 is set here at a speed at which a sufficient deviation between the steering wheel angular velocity and the estimated turning angular velocity (actual turning angular velocity) is generated when the clutch is released.

When the instructed turning angular velocity exceeds prescribed value A0, flow in the flow chart of FIG. 16 goes from step S1 to step S41 and then to step S3. In step S3 flow goes from step S3 to step S5 when the deviation between the actual turning angle and the estimated turning angle equals or exceeds prescribed value C. In step S5 it is judged that there is a state of clutch erroneous engagement.

When the instructed turning angular velocity does not exceed prescribed value A0, flow in the flow chart of FIG. 16 goes from step S1 to step S41 and then to step S42. In step S42 the instructed turning angular velocity is compared with prescribed value A3. Specifically, in step S42 flow continues to step S4 when the instructed turning angular velocity exceeds prescribed value A3. If it does not exceed prescribed value A3 the clutch engagement determination is not performed, and processing comes to an end. In step S4 flow continues to step S5 when the deviation between the steering wheel angular velocity and the actual turning angular velocity is lower than prescribed value B. In step S5 it is judged that there is a state of clutch erroneous engagement.

Figure 17:
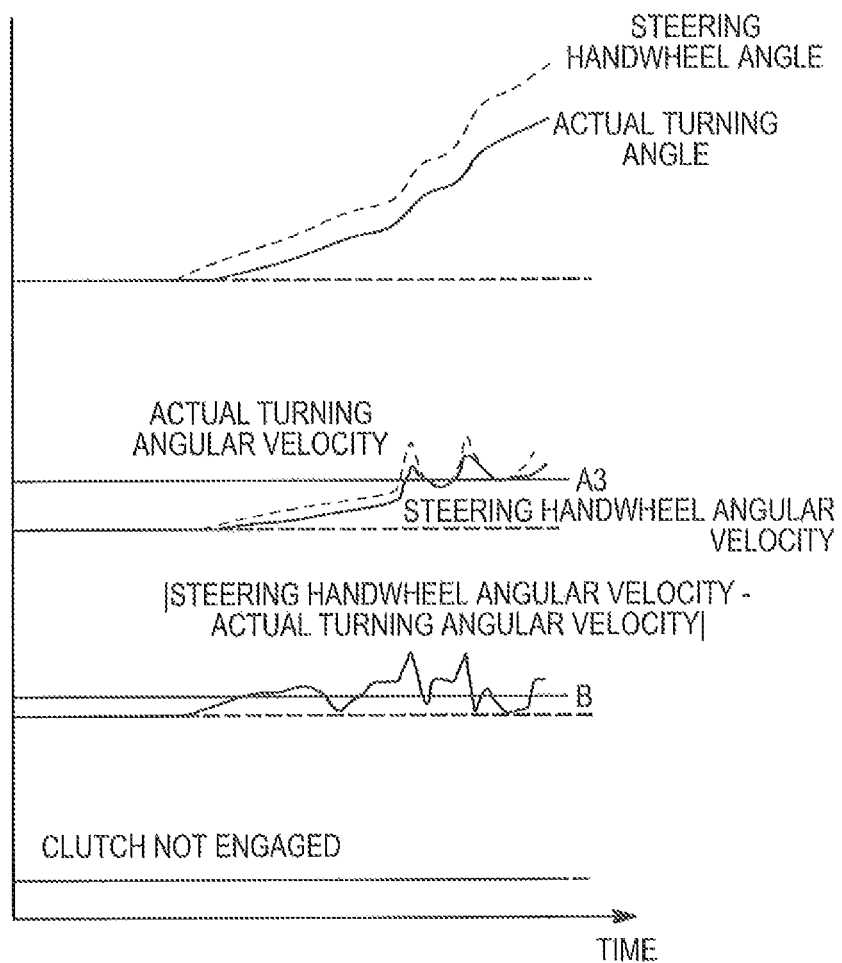
FIG. 17 is a time chart illustrating the backup clutch erroneous engagement determination operation when the steering wheel angle is gradually increased when the backup clutch is released.
Figure 18:
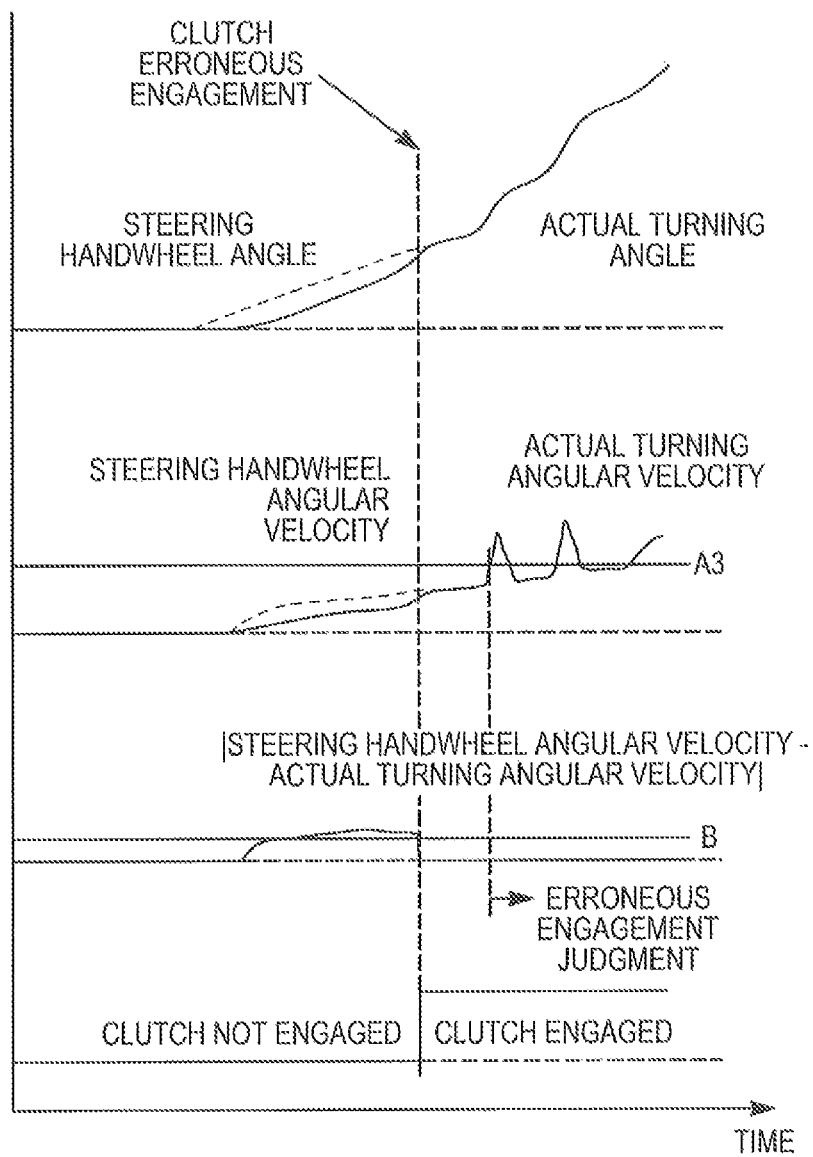
FIG. 18 is a time chart illustrating the backup clutch erroneous engagement determination operation when the steering wheel angle is gradually increased in the case of backup clutch erroneous engagement.

When the steering wheel angle is increased all the way (see FIG. 6), it is possible to perform the clutch engagement determination based on deviation between the actual turning angle and the estimated turning angle in step S3. As shown in FIGS. 17 and 18, when the driver holds steering wheel 1 and gradually increases the steering wheel angle, it is difficult to perform the clutch engagement determination based on the deviation in angle because the change in angle is small.

In the fourth embodiment, when a steering wheel angular velocity that is rather high occurs (i.e., higher than prescribed value A3), there is a deviation between the steering wheel angular velocity and the actual turning angular velocity when the clutch is released. As a result, it is possible to perform the clutch engagement determination based on this deviation.

As explained above, the same first through third effects of the first embodiment can be realized with the vehicle steering controller in the fourth embodiment.

The above explanation has involved four embodiments, but the specific construction of the invention is not limited to the four disclosed embodiments. For example, in process step S3 of FIG. 3 in the first embodiment it is judged that there is clutch erroneous engagement when the absolute value of the deviation between the actual turning angle and the estimated turning angle meets or exceeds prescribed value C. Alternately, in step S4 it is judged that there is clutch erroneous engagement when the absolute value of the deviation between the steering wheel angular velocity and the actual turning angular velocity is equal to or smaller than prescribed value B. However, one may also adopt the following scheme in which a judgment of clutch erroneous engagement is made only when the conditions of both steps S3 and S4 are met.

The following scheme can also be adopted. When the angular region of the steering wheel angle when clutch erroneous engagement takes place is larger than the prescribed values A0-A3, the threshold is set at the angular velocity at which clutch erroneous engagement is generated. The clutch engagement determination is performed when the value exceeds the threshold.

The following scheme can also be adopted. When clutch erroneous engagement depends on the steering wheel angle, the steering wheel angle is used instead of the instructed turning angular velocity in performing the judgment or decision.

In the application examples described, clutch erroneous engagement determination is performed during steer-by-wire operation. However, the following scheme can also be adopted. When a transition is made from steer-by-wire control to assisting control, clutch engagement determination is performed to check whether the clutch is engaged. In this case, the precondition is that no malfunction develops in steering angle sensor 2 and turning angle sensor 6.

Also, the above-described embodiments have been described in order to allow easy understanding of the present invention and do not limit the invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A vehicle steering device for steering at least one wheel of a vehicle, the steering device comprising:
    a steering instrument operable to receive input from a driver;
    a turning device operable to turn the at least one wheel;
    a selectively engageable backup clutch positioned between the steering instrument and the turning device; and
    a controller configured to judge whether the backup clutch is engaged based on a steering state signal from the steering instrument and a turning state signal from the turning device.

2. The vehicle steering device according to claim 1 wherein the controller is further configured to judge whether the backup clutch is engaged based on a response characteristic of one of the steering instrument or the turning device responsive to operation of the other of the steering instrument or the turning device.

3. The vehicle steering device according to claim 2 wherein the response characteristic is a tracking delay between the turning state signal and the steering state signal.

4. The vehicle steering device according to claim 1 wherein the steering state signal is a manipulation speed of the steering instrument and the turning state signal is a turning speed of the turning device; and wherein the controller is further configured to judge that the backup clutch is engaged when a deviation between the manipulation speed and the turning speed is smaller than a predetermined threshold.

5. The vehicle steering device according to claim 1 wherein the steering state signal is a manipulation amount of the steering instrument and the turning state signal is an actual turning angle of the turning device; and wherein the controller is further configured to judge that the backup clutch is engaged when a deviation between an estimated turning angle estimated from an instruction turning angle corresponding to the manipulation amount and the actual turning angle exceeds a predetermined threshold.

6. The vehicle steering device according to claim 5 wherein the predetermined threshold corresponds to a responsiveness of a turning actuator control.

7. The vehicle steering device according to claim 1 wherein the steering state signal is a manipulation speed of the steering instrument; and wherein the controller is further configured to judge whether the backup clutch is engaged when the manipulation speed exceeds a predetermined speed.

8. The vehicle steering device according to claim 1, further comprising:
a turning actuator operable to output a turning torque to the turning device; and wherein the controller is further configured to supply a prescribed change quantity to an instructed turning angle corresponding to the steering state signal when a current value of the turning actuator indicates that turning of the at least one wheel is hindered and to judge whether the backup clutch is engaged based on the steering state signal when the prescribed change quantity is supplied to the instructed turning angle.

9. The vehicle steering device according to claim 8 wherein the controller is further configured to change the instructed turning angle in a resetting direction until a predetermined time has elapsed.

10. The vehicle steering device according to claim 1 wherein the controller is further configured to perform variable turning control in which a ratio of the turning state signal to the steering state signal varies when the backup clutch is in a released state; and wherein the controller is further configured to judge whether the backup clutch is engaged when variable turning control is performed.

11. The vehicle steering device according to claim 1, further comprising:
a turning actuator operable to apply a turning torque to the turning device; and
a steer-by wire controller configured to release the backup clutch and to drive the turning actuator to perform steer-by-wire control so that the turning angle corresponds to the steering state signal; and wherein the controller is further configured to judge whether the backup clutch is engaged during steer-by-wire control.

12. A vehicle steering device for at least one wheel, the steering device comprising:
steering means for receiving instructions for the at least one wheel from a driver;
turning means for turning the at least one wheel responsive to the steering means;
clutch means releasably engageable between the steering means and the turning means for steering the at least one wheel when the clutch means is engaged;
steering detection means for detecting a steering state of the steering means;
turning detection means for detecting a turning state of the turning means; and
judgment means for judging whether the clutch means is engaged based on the steering state and the turning state.

13. A vehicle steering control method for controlling at least one wheel using a steer-by-wire steering system including a steering instrument and a turning device responsive to signals from the steering instrument and a releasably engageable backup clutch between the steering instrument and the turning device, the method comprising:
detecting a steering state signal from the steering instrument;
detecting a turning state signal from the turning device; and
judging whether the backup clutch is engaged based on the steering state signal and the turning state signal.

14. The vehicle steering control method according to claim 13 wherein the judging step further comprises judging whether the backup clutch is engaged based on a response characteristic of one of the steering instrument or the turning device, the a response characteristic responsive to operating the other of the steering instrument or the turning device.

15. The vehicle steering control method according to claim 14 wherein the response characteristic is a tracking delay between the turning state signal and the steering state signal.

16. The vehicle steering control method according to claim 13 wherein the steering state signal is a manipulation speed of the steering instrument and the turning state signal is a turning speed of the turning device; and wherein the judging step further comprises judging whether the backup clutch is engaged when a deviation between the manipulation speed and the turning speed is smaller than a threshold value.

17. The vehicle steering control method according to claim 13 wherein the steering state signal is a manipulation amount of the steering instrument and the turning state signal is an actual turning angle of the turning device; and wherein the judging step further comprises judging whether the backup clutch is engaged when a deviation between the actual turning angle and an estimated turning angle derived using the manipulation amount exceeds a predetermined threshold.

18. The vehicle steering control method according to claim 13 wherein the steering state signal is a manipulation speed of the steering instrument; and wherein the judging step further comprises judging whether the backup clutch is engaged when the manipulation speed exceeds a threshold speed.

19. The vehicle steering control method according to claim 13, further comprising:
supplying a change quantity to an instructed turning angle of the turning device when a turning of the at least one wheel is hindered, the instructed turning angle corresponding to the steering state signal; and wherein the judging step further comprises judging whether the backup clutch is engaged based on the steering state signal when the change quantity is supplied to the instructed turning angle.

20. The vehicle steering control method according to claim 13, further comprising:
performing variable turning control in which a ratio of the turning state signal to the steering state signal varies when the backup clutch is in a released state; and wherein the judging step further comprises judging whether the backup clutch is engaged when variable turning control is performed.

21. The vehicle steering device according to claim 1 wherein the steering state signal corresponds to a measured operating characteristic of the steering instrument and the turning state signal corresponds to a measured operating characteristic of the turning device.

22. The vehicle steering control method according to claim 13 wherein the steering state signal corresponds to a measured operating characteristic of the steering instrument and the turning state signal corresponds to a measured operating characteristic of the turning device.

* * * * *